United States Patent [19]

Ishida

[11] 4,257,077
[45] Mar. 17, 1981

[54] PRESSURE PAD AND SHIELDING PLATE FOR A TAPE CASSETTE

[75] Inventor: Toshihiko Ishida, Tokyo, Japan

[73] Assignee: TDK Electronics Co., Ltd., Tokyo, Japan

[21] Appl. No.: 21,172

[22] Filed: Mar. 16, 1979

[30] Foreign Application Priority Data

Apr. 1, 1978 [JP] Japan .............................. 53-42759[U]
Apr. 3, 1978 [JP] Japan .............................. 53-43609[U]

[51] Int. Cl.³ ...................... G11B 23/08; G11B 15/60
[52] U.S. Cl. ............................... 360/130.33; 242/199; 360/132
[58] Field of Search ........... 360/130.33, 130.3, 130.31, 360/130.32, 128, 132; 242/75.2, 199, 210

[56] References Cited

U.S. PATENT DOCUMENTS

| | | | |
|---|---|---|---|
| 3,126,163 | 3/1964 | Knox | 360/130.33 |
| 3,130,933 | 4/1964 | Pillsbury, Jr. et al. | 242/210 |
| 3,210,482 | 10/1965 | Fischer | 360/130.33 |
| 3,378,266 | 4/1968 | Karecki | 360/130.32 |
| 3,789,157 | 1/1974 | Greiner et al. | 360/130.33 |
| 3,851,115 | 11/1974 | Zacaroli | 360/132 |
| 3,984,049 | 10/1976 | Shawen | 360/130.31 |

*Primary Examiner*—Alfred H. Eddleman
*Attorney, Agent, or Firm*—Oblon, Fisher, Spivak, McClelland & Maier

[57] ABSTRACT

A tape cassette comprises a supporting arm extending over a magnetic shielding plate, a movable body supported by the supporting arm to be movable forward and backward and a resilient material disposed between the movable body and the supporting arm whereby a head can be inserted along the magnetic shielding plate to improve magnetic shielding effect and magnetic recording and reproducing characteristics.

7 Claims, 8 Drawing Figures

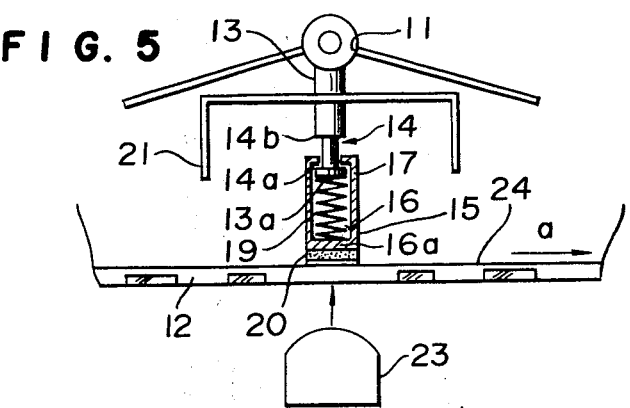
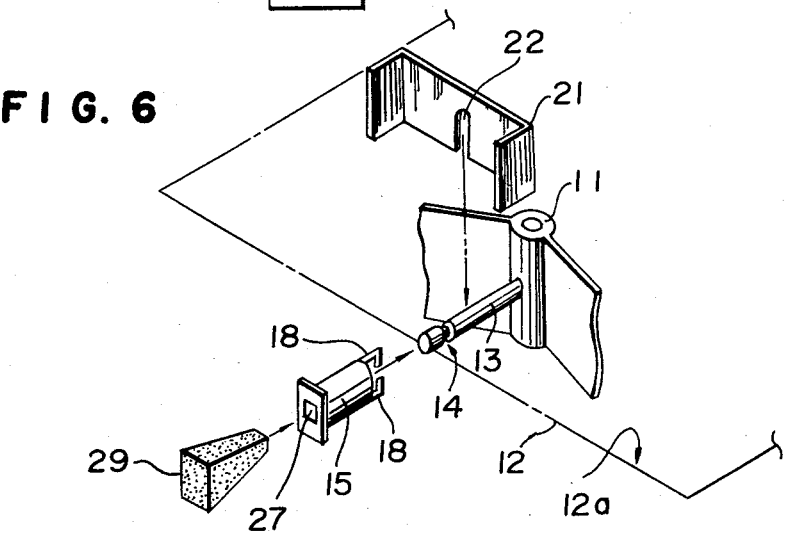
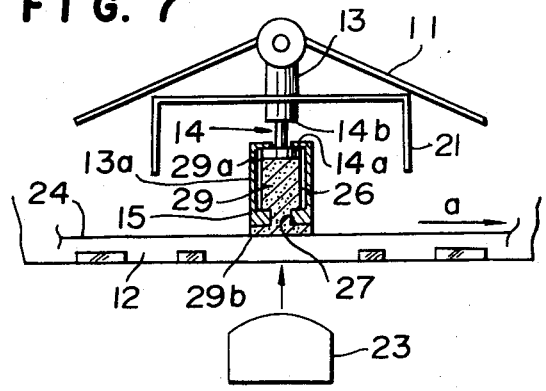
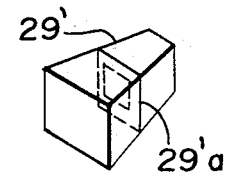

PRESSURE PAD AND SHIELDING PLATE FOR A TAPE CASSETTE

BACKGROUND OF THE INVENTION

1. Field of the Invention

The present invention relates to a tape cassette comprising a magnetic tape feeding reel and a winding reel in a single case.

2. Description of the Prior Art

In this type of tape cassette, a magnetic tape is passed under pressure between a head and a pad disposed abutting to the head to perform the write-in of a data on the magnetic tape or the read out of the data from the magnetic tape. A magnetic shielding plate is disposed in the rear of the pad to shield the magnetic effect to the other part of the magnetic tape which is caused by the head.

FIGS. 1 and 2 are respectively schematic views of a pad of the conventional tape cassette. In FIG. 1, the pad (4) is provided by adhering an elastic material (3) such as urethane foam on the surface of an elastic plate (2) along the direction (a) for passing the tape (1) and a magnetic sheilding plate (5) having a channel shape is set up in the rear of the pad (4). The reference numerals (6) and (7) respectively designate supporting poles for supporting the pad (4) which is projected from the inner surface of the cassette case (8).

In the conventional pad, the elastic plate (2) of the pad (4) prevents the insertion of the head (9) into the magnetic shielding plate whereby the magnetic shielding can not be obtained satisfactorily.

FIG. 2 shows the other pad proposed to improve the disadvantage of the pad of the conventional tape cassette wherein a pad (4') formed by urethane foam etc. having a rectangular cross section is directly adhered on the central portion of the surface (5'a) of the magnetic shielding plate (5'). The reference numeral (10) designates a film made of such as vinyl which is adhered at the top of the pad (4') in order to reduce the friction.

However, in the conventional tap cassette, it is necessary to elongate the pad (4') to give a good contacting effect and a buffering effect because the contacting pressure between the head (9) and the pad (4') should be compensated only by the reacting force of the urethane foam itself which forms the pad (4'). Therefore, when the tape is passed as shown in FIG. 3, the pad (4') is deformed in the direction (a) for passing the tape (1) to deflect the position of the pad (4') from the head (9) disadvantageously.

The length of the pad (4') can be substantially reduced by using resilient material having excellent elasticity for the pad (4'). However, it is difficult to improve the deformation of the pad by selecting the resilient material because a large deformation is simultaneously caused. When the deformation of the pad is large, its reaction force is also high to cause an unstable movement of the pad (4') during passing the tape. Accordingly, a level fluctuation is easily caused in the high frequency wave range to give an inferior reproducing characteristic disadvantageously.

SUMMARY OF THE INVENTION

It is an object of the present invention to overcome the disadvantages of the conventional tape cassette and to provide a tape cassette which improves the magnetic shielding effect and prevents the deformation of the pad to improve the recording reproduction characteristic especially in the high frequency wave range.

The foregoing and other objects of the present invention have been attained by a tape cassette comprising a supporting arm extending over a magnetic shielding plate; a movable body supported by the supporting arm to be movable forward and backward and a resilient material disposed between the movable body and the supporting arm.

BRIEF DESCRIPTION OF THE DRAWINGS

FIG. 5 is a sectional view in assembled condition of the embodiment of the invention;

FIG. 6 is an exploded view of the main parts of another embodiment of the tape cassette according to the present invention;

FIG. 7 is a sectional view in assembled condition of the embodiment of the invention; and FIG. 8 is a slant view of an embodiment of a resilient material according to the present invention.

DETAILED DESCRIPTION OF THE PREFERRED EMBODIMENTS

Figure 1:
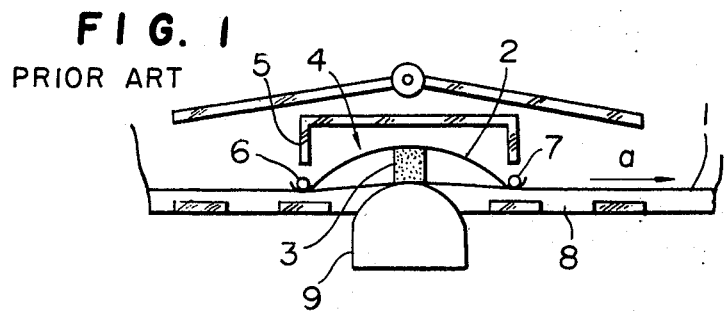
FIGS. 1 to 3 are respectively schematic views of the conventional tape cassette.
Figure 2:
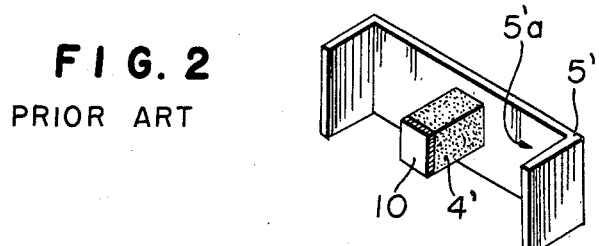
Figure 3:
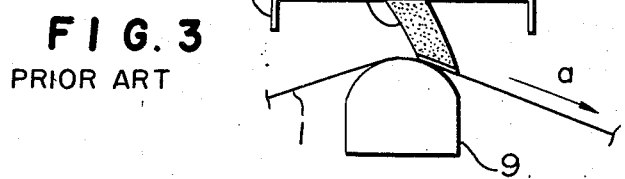

Preferred embodiments of the present invention will be illustrated referring to the drawings.

Figure 4:
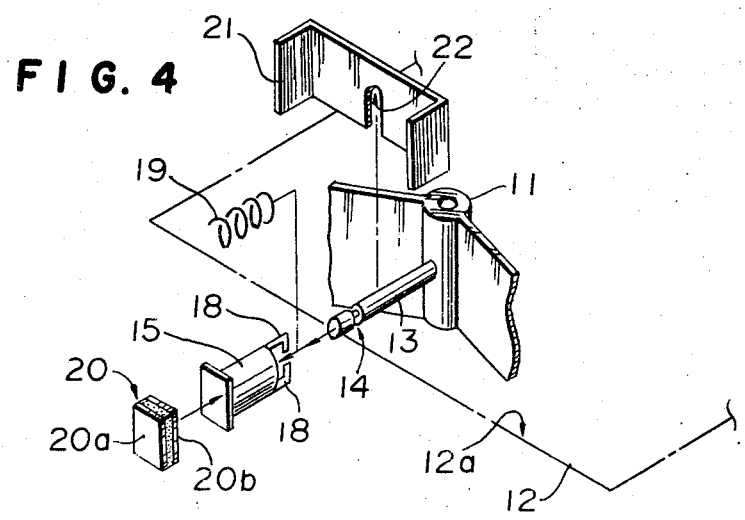
FIG. 4 is an exploded view of the main parts of one embodiment of the tape cassette according to the present invention.

FIG. 4 is an exploded view of main parts of a tape cassette of the present invention and FIG. 5 is a sectional view of the main parts. In the drawings, a supporter (11) is fixed on an inner surface (12a) of the tape cassette and a supporting arm (13) is extended from the supporter (11) in one piece to be parallel to the inner surface (12a). The supporting arm (13) is formed in cylindrical shape and has a concentrical annular groove (14) near the extreme edge. A movable body (15) receives the end of the supporting arm (13) which is reciprocally slidable in a cavity (16) which has a diameter larger than the outer diameter of the supporting arm (13). The movable body (15) comprises, at the rear of the opening (17), a pair of restriction pieces (18),(18) for limiting the movement of the movable body (15) by contacting both of the shoulders (14a) and (14b) of the annular groove (14) of the supporting arm (13).

A coil spring (19) is disposed in the cavity (16) of the movable body (15) so as to press by spring action the top surface (13a) of the supporting arm (13) and the bottom surface (16a) of the movable body (15).

Thus, the embodiment of the invention comprises the supporting arm (13) extending over the magnetic shielding plate (21), the movable body (15) supported by the supporting arm (13) to be reciprocally movable and the pad, in which the coil spring is inserted between the movable body (15) and the supporting arm (13) whereby the head can be deeply inserted along the magnetic shielding plate (21) to improve the magnetic shielding effect remarkably.

FIGS. 6 to 8 show the other embodiment of a tape cassette according to the present invention. The same reference numerals designate the same or corresponding parts in the Figures.

The reference numeral (29) designates a flexible elastic material made of such as urethane foam. The elastic material is formed in frustoconical and it is forcibly inserted through an opening (27) of the movable body

(15) to the cavity (26) from the head porton (29a) to the tail portion. The elastic material (29) is deformed depending upon the shape of the opening (27) and the cavity (26) because of its elasticity and a portion of the elastic material is compacted by the inner wall of the opening (27) to engage with the movable body (15) thereby to push under spring action the top surface (13a) of the supporting arm (13) in the cavity (26).

The rear portion (29b) of the elastic material (29) is remained on the end surface of the movable body (15) keeping a suitable thickness so as to cover the surface.

FIG. 8 shows the other embodiment of the elastic material.

The feature of the elastic material of the embodiment is to form a slit (29'a) in a portion corresponding to the opening (27) so as to coincide to the inner diameter of the opening (27). The slit (29'a) reduces the compacting degree in the opening to reduce the deformation of the surface of the end portion (29b) of the elastic material (29) which covers the end surface of the movable body (15) whereby an excellent contacting surface can be given for the head advantageously.

In the embodiment of the present invention, the end portion of the supporting arm (13) extending over the magnetic shielding plate (20) is fitted in the cavity (26) of the movable body (15) to be reciprocally slidable and the flexible elastic material (29) is forcibly inserted in the end surface of the movable body in order to form the pad whereby the head (23) can be deeply inserted along the magnetic shielding plate (21) to remarkably improve the magnetic shielding effect.

When the slit (29'a) is formed in the elastic material (29) as shown in FIG. 8, the deformation of the surface (29b) of the elastic material (29) is prevented to give an excellent contacting surface to the head (22).

A buffer (20) made of such as felt is contacted to the top surface of the movable body (15). The buffer (20) is formed in plate shape and is fitted to the movable body such that, for example, thin films (20a) and (20b) such as vinyl film are contacted on both surfaces of the member (20) and the thin film (20b) is peeled off to adhere the member (20) to the top surface of the movable body (15). The thin film (20a) is remained in contacting condition and is used for friction-reducing material for reducing the friction to the magnetic tape.

A magnetic shielding plate (21) is provided with a notch (22) having a width being larger than the outer diameter of the supporting arm (13). The magnetic shielding plate (21) can be mounted on the supporting arm (13) by fitting the arm (13) in the notch (22).

In accordance with the present invention, the movable body (15) is only movable in the forward and backward direction, that is, the direction perpendicular to the head whereby the movable body is not deformed in the direction passing the tape and is not dropped out. Accordingly, the contacting relation of the movable body (15) forming the pad and the head (23) is always maintained in a proper condition and the recording characteristic in high frequency range and reproducing characteristic is further improved comparing to the conventional tape cassette.

In accordance with the present invention, recording and reproducing characteristic can be improved by forming the buffer as thin as possible to prevent the deforming of the buffer (20).

What is claimed as new and desired to be secured by Letters Patent of the United States is:

1. A tape cassette comprising:
   a casing for said tape;
   an opening in said casing for a magnetic head, said tape adapted to be moved past said opening for contact by one side of said tape with said head;
   a magnetic shielding plate fixed in said casing at a location adjacent said opening and on the other side of said tape;
   a supporting arm fixed to said casing and extending from at least said magnetic shielding plate towards said tape;
   a movable body supported by said supporting arm for movement towards and away from said tape only; and
   resilient means disposed between said supporting arm and said movable body, said resilient means adapted to bias said movable body towards said tape;
   whereby said tape may be moved by said head towards said shielding plate against the biasing force of said resilient means.

2. A tape cassette according to claim 1 wherein said resilient means comprises a coil spring.

3. A tape cassette according to claim 2 including a buffer contacted to the top surface of a second end of said movable body.

4. A tape cassette according to claim 1 wherein the said resilient means comprises elastic material made of plastic.

5. A tape cassette according to claim 1 wherein the relative movement of the supporting arm and the movable body is restricted by cooperation of an annular groove formed on the supporting arm and a pair of restriction pieces on a first end of the movable body.

6. The tape cassette of claim 1 wherein said movable body is hollow and includes a first opening in a first end adjacent said supporting arm wherein one end of said supporting arm is inserted in said first opening of said movable body, and wherein said resilient means is positioned in said hollow movable body between said one end of said supporting arm and a second end of said hollow movable body.

7. The tape cassette of claim 6 wherein said resilient means is a length of elastic material, wherein said second end of said hollow movable body includes a second opening, wherein said elastic material is positioned partly through said second opening whereby a portion of said elastic material is in said hollow movable body, and wherein said elastic material includes a slit at said second opening whereby said elastic material is not distorted by said second opening.

* * * * *